Feb. 5, 1935. W. H. HERDLEIN 1,990,324
AIR CONDITIONING SYSTEM
Filed Dec. 20, 1933    7 Sheets-Sheet 1

INVENTOR
Wallace H. Herdlein
BY F. H. Gibbs
ATTORNEY

Feb. 5, 1935.   W. H. HERDLEIN   1,990,324
AIR CONDITIONING SYSTEM
Filed Dec. 20, 1933   7 Sheets-Sheet 5

INVENTOR
Wallace H. Herdlein
BY J. H. Sibbs
ATTORNEY

Patented Feb. 5, 1935

1,990,324

UNITED STATES PATENT OFFICE 1,990,324

AIR CONDITIONING SYSTEM

Wallace H. Herdlein, St. Louis, Mo., assignor to American Car & Foundry Company, New York, N. Y., a corporation of New Jersey Application December 20, 1933, Serial No. 703,202

17 Claims. (Cl. 257—7)

This invention relates to air conditioning systems and has particular reference to a system adapted for use with railway passenger cars.

One object of the present invention is the provision of a simple and comparatively inexpensive, compact construction for use with railway passenger cars which is operative to withdraw air from the passenger compartment of a railway car and temperature condition said air and then recirculate it through the passenger compartment.

Another object of this invention is the provision of an air conditioning system for railway cars which is adapted to be installed without great modification or rearrangement of the car structure and in which system the air is temperature conditioned to suit desired and required conditions which are to be maintained within the passenger compartment of the car.

A further object of this invention is the provision of an air conditioning system in which water is sprayed into the air to cleanse and humidify the same, the water then being returned to be recooled and recycled to again function as a cleansing and humidifying agent; the present system including a continuous circulation of water for cleansing and humidifying purposes and also having means whereby excess water in the system may be discharged out of the car.

Other objects and advantages of this invention will be apparent from the following description taken in conjunction with the accompanying drawings in which.

Figure 1:
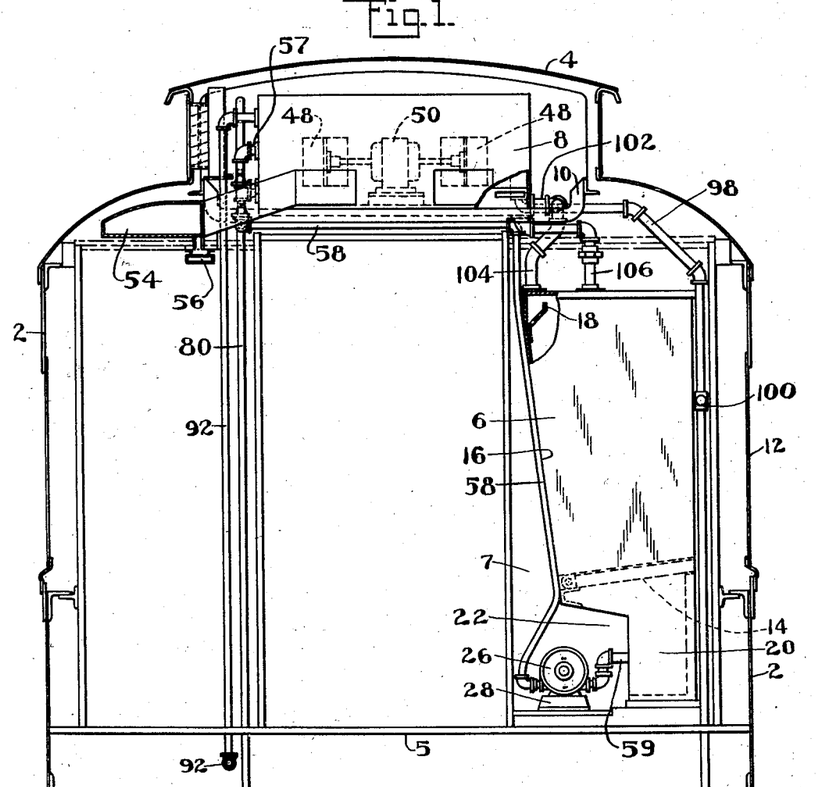
Figure 1 is a view looking through a railway passenger car toward one end thereof, portions of the car being diagrammatically shown and the view showing the present invention applied within the car.
Figure 2:
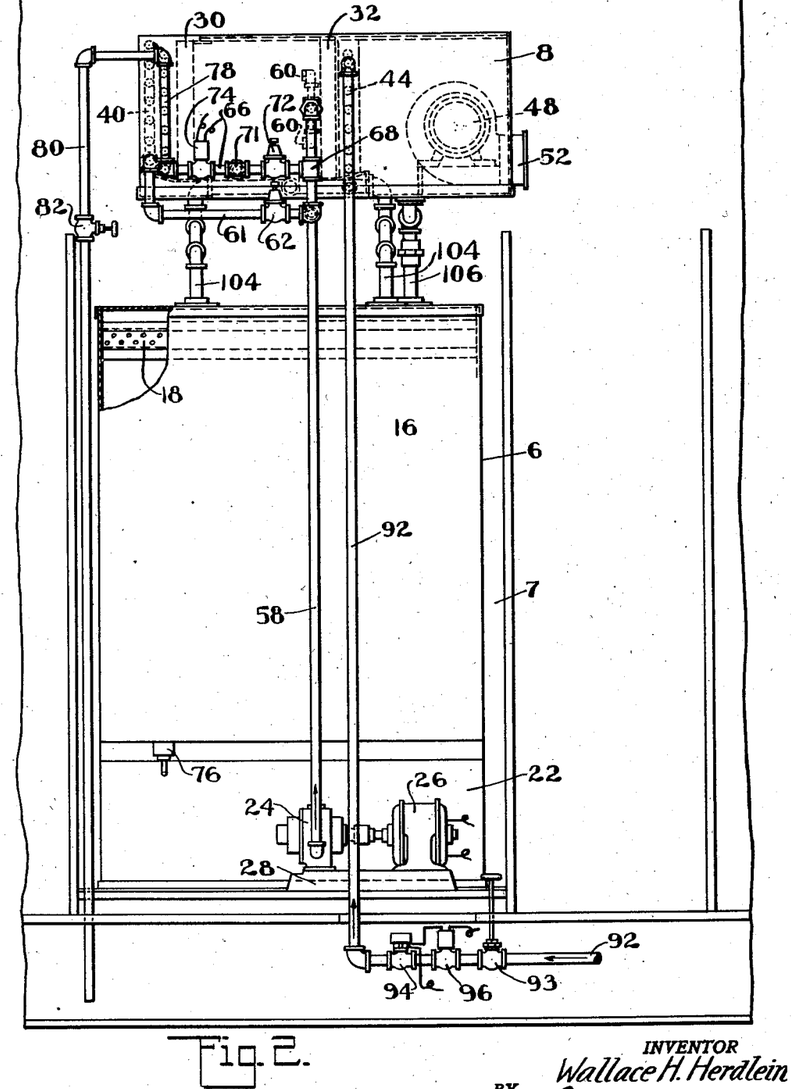
Fig. 2 is a view showing the present invention in side elevation applied in a car, portions only of the latter being shown.

Referring now more particularly to Figs. 1 to 5 of the drawings, in which similar characters of reference designate similar parts in the several views, portions of a railway passenger car are diagrammatically illustrated in Fig. 1, including side walls 2, a roof 4, and a floor 5. The air conditioning system of the present invention is adapted to use water ice as a cooling medium and includes an ice chamber 6 arranged within a suitable compartment 7 formed adjacent one end of the car, and an air conditioning cabinet 8 suitably supported by brackets 10 adjacent the car roof. The ice chamber 6 is provided with a door (not shown) which is alined with a door 12 formed in the side wall of the car body (see Fig. 1) to permit the placement of ice within the chamber 6 on a grate 14 which, in the instance shown in the drawings, slopes downwardly toward the rear wall 16 of the chamber 6. As clearly shown in Fig. 1, the rear wall 16 of the chamber 6 slopes upwardly and outwardly from the grate 14 and adjacent its upper end has a drip trough 18 secured thereto. The lower end portion of chamber 6 is reduced in diameter to provide a water tank or reservoir 20 which, when water ice is being used, receives water melting from the ice, the reduction in diameter providing a space 22 within the compartment 7 for receiving a pump 24 and its driving motor 26 mounted on a suitable support 28. Motor 26 may be, and preferably is, of the multi-speed type and any means well-known in the art, such for example as a rheostat, may be utilized for obtaining and controlling the desired motor speed, but inasmuch as multi-speed motors and their regulating means are well-known in the art the motor is shown more or less diagrammatically.

Figure 3:
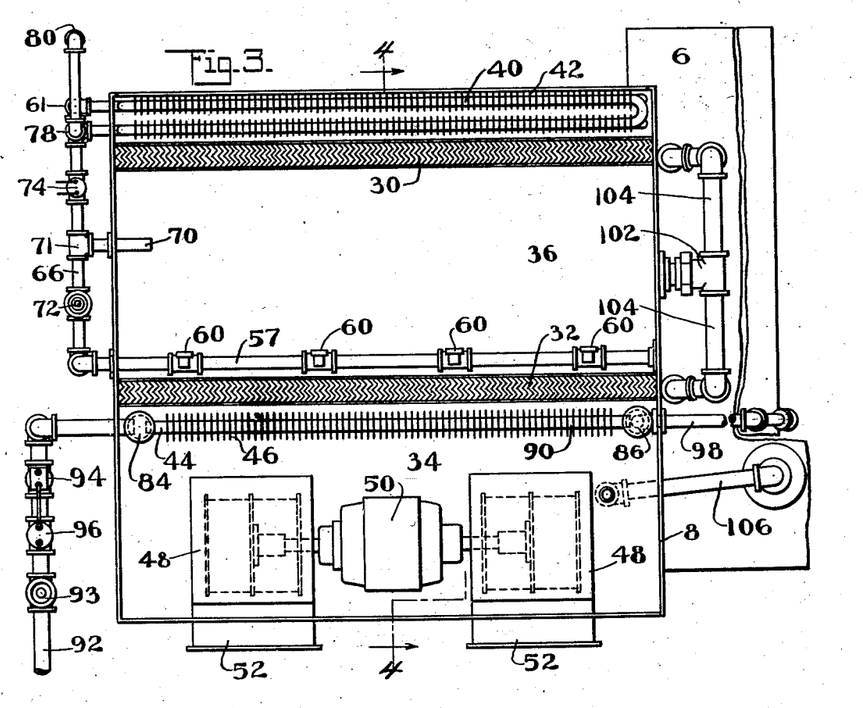
Fig. 3 is a top plan view of the air conditioning cabinet with the top wall removed, the view also showing certain external piping connections.
Figure 4:
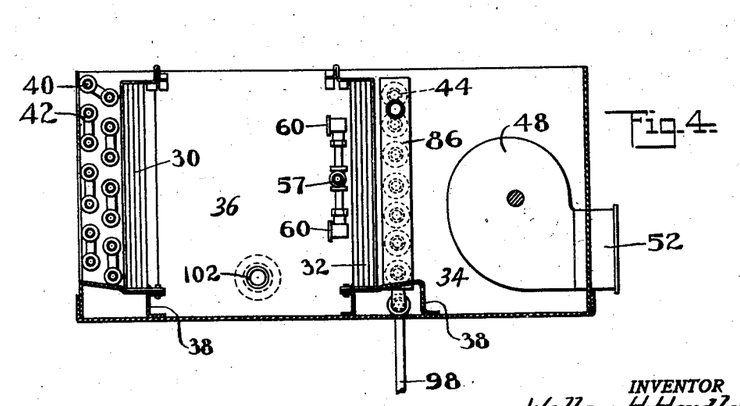
Fig. 4 is a sectional view on the line 4—4, Fig. 3.

The cabinet 8 receives air to be conditioned and is substantially of box-like form divided by spaced eliminators 30 and 32 respectively into a blower chamber 34 and a spray chamber 36, the spray chamber being defined between said eliminators, as clearly shown in Figs. 3 and 4. The eliminators are mounted on suitable supports 38 secured to the bottom of the cabinet and the rear end of said cabinet is open to permit entrance of air thereinto. Arranged at the open end of the cabinet is a heat exchange coil 40 which receives a cooling medium as will be more fully described hereinafter, said coil being provided with fins 42 for increasing the effective cooling surfaces. Arranged in the blower chamber 34 adjacent the eliminator 32 is a heating coil 44 provided with fins 46. The blower chamber also contains fans arranged within fan housings 48, and a motor 50 for operating the fans to draw air into the cabinet and force the air out through discharge nozzles 52 into ducts 54 arranged longitudinally of the car body adjacent the roof and having discharge outlet fittings 56 from which the air from the ducts 54 is discharged directly into the passenger compartment of the car.

Arranged in the spray chamber 36 is a spray pipe 57 connected with a delivery pipe 58 leading from the pump 24, the latter being operated to cause water to be withdrawn from reservoir 20 through a pipe 59 to be forced to the spray pipe 57 for discharge through nozzles 60 into the spray chamber and into the air passing through the cabinet 8. Leading from the pipe 58 and connected to the inlet end of cooling coil 40 is a coil feeder pipe 61 having a pressure relief valve 62 therein adapted to be opened upon increase in pressure in pipe 58 beyond a predetermined amount to permit passage of water through the coil 40. Connected with the outlet end of the coil 40 is a branch pipe 66 extending to and coupled with delivery pipe 58 as shown at 68, the pipe 66 receiving water from the coil 40 and discharging it into the spray chamber 36 through a relatively short outlet 70 coupled to said branch pipe shown at 71. Between couplings 68 and 71, pipe 66 is provided with a pressure relief valve 72 which is adapted to be operated to open position by the pressure of water in pipe 58. In practice, valves 62 and 72 are adjusted so as to be operated in response to respectively different pressures in pipe 58; the pressure required to operate valve 72 being greater than that required to operate valve 62 as will be more clearly described hereinafter. Between the outlet of the coil 40 and coupling 71 is a magnetic valve 74 electrically connected with a float-controlled pressure switch 76, the latter being operative upon increase in water in said reservoir beyond a pre-determined amount to operate said valve 74 to closed position whereby water passing through the coil 40 is prevented from discharging into the spray chamber 36 but is forced to pass upwardly through a riser 78 coupled to branch pipe 66 and through a discharge pipe 80, the lower end of which is arranged below the car floor to discharge excess water from the reservoir out of the system. Arranged in the discharge pipe 80 is a valve 82 which may be manually adjusted to regulate the flow of water through the discharge pipe 80.

The heating coil 44 comprises oppositely arranged vertical inlet and exhaust headers 84 and 86, respectively, (see Fig. 3), connected by finned pipes 90, header 84 receiving steam from the main steam line of the car through a steam feeder pipe 92 having a pressure switch 94 therein operative in response to excess pressure developed in heating coil 44 to effect closing of a magnetic valve 96 in pipe 92 to control the passage of steam through said feeder pipe. Also arranged in pipe 92 is a manually controlled cut-off valve 93 for shutting off the passage of steam to coil 44 during times when it is not necessary to heat air during passage through the air conditioning cabinet 8. The heating coil 44 is provided with a discharge pipe 98 which leads from the exhaust header 86 and has its lower end arranged below the car floor to discharge water of condensation out of the system. Arranged in the discharge pipe 98 is a suitable steam trap 100 (see Figs. 1 and 5).

The water which is sprayed into chamber 36 from nozzles 60 is adapted to be returned to the reservoir 20 through a discharge fitting 102 in the form of a T from which branches 104 extend in opposite directions and discharge water into the ice chamber at points immediately above the drip trough 18 therein, as shown clearly in Fig. 1. To provide for removing any water which may collect within the blower chamber 34 a drain pipe 106 leads from the blower chamber and discharges into the ice chamber as shown in Figs. 1 and 3. To fully empty reservoir 20 of water in order to clean the ice chamber, a drain 107 is provided having a valve 109.

From the description above it can be seen that in the system shown in Figs. 1 to 5, inclusive, and with ice in the chamber 6, air from the passenger compartment of the car is drawn through the air conditioning cabinet by means of the fans in the housings 48, the air passing first through the cooling coil 40 where its temperature is reduced, then into the spray chamber through eliminators 30, the air being cleansed and de-humidified by means of the water sprays and then passing through the opposite eliminators 30 into the blower chamber 34 and then into the passenger compartment of the car. During seasons of the year when steam is utilized for heating the air, the air after passing through the eliminators adjacent the water spray devices first contacts with the heating coil 44 where it becomes heated prior to being forced out of the blower chamber into the car.

Figure 6:
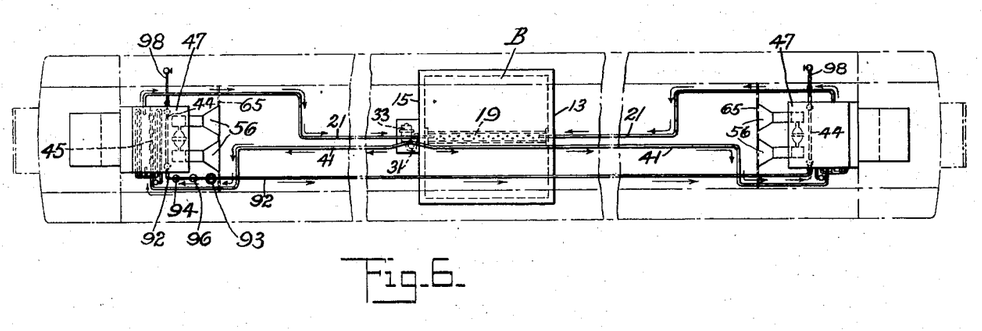
Fig. 6 is a top plan view of a modified form of the invention showing same applied to a railway car, the latter being shown more or less diagrammatically.
Figure 7:
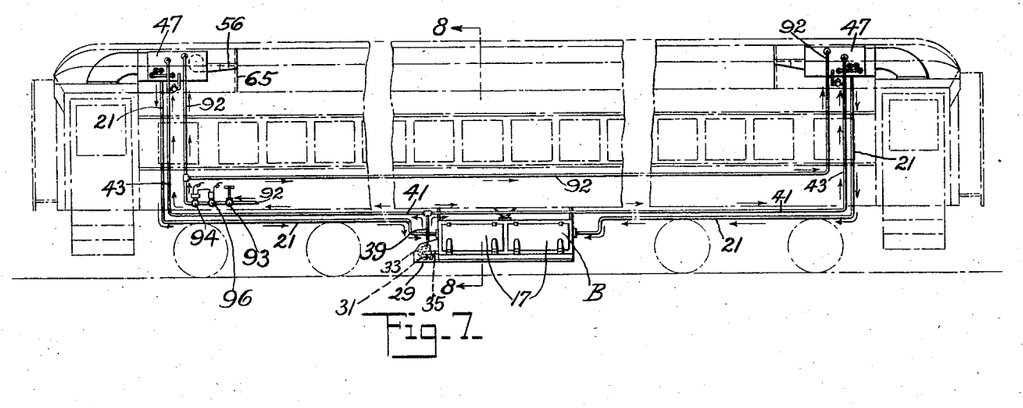
Fig. 7 is a side elevation of the modified form of the invention shown in Fig. 6, applied to a railway car shown diagrammatically in broken lines.
Figure 8:
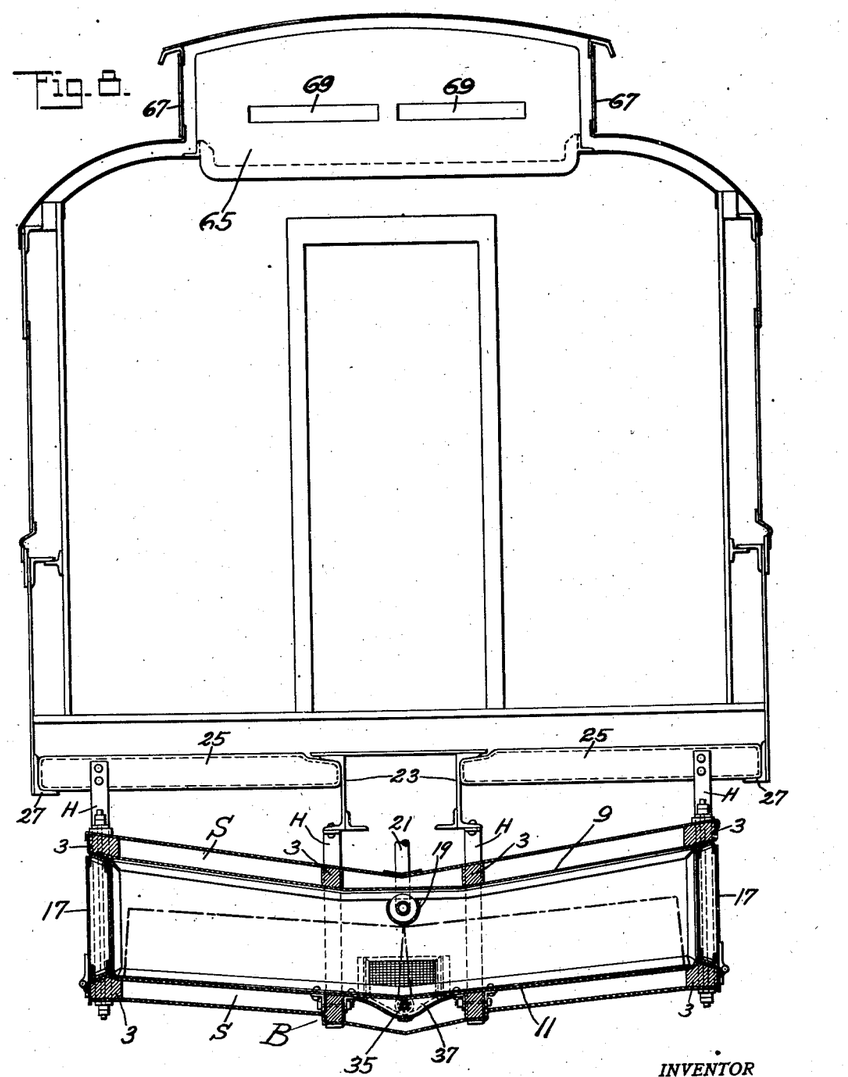
Fig. 8 is a section view on the line 8—8, Fig. 7.
Figure 9:
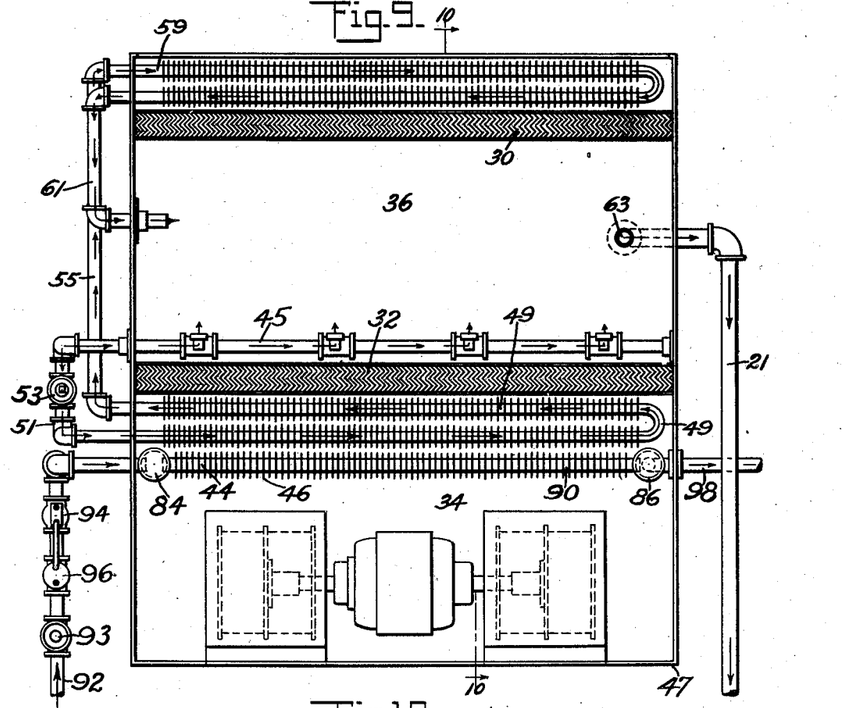
Fig. 9 is a top plan view of the air conditioning cabinet used with the form of the invention shown in Figs. 6 and 7, the top wall of said cabinet being removed.
Figure 10:
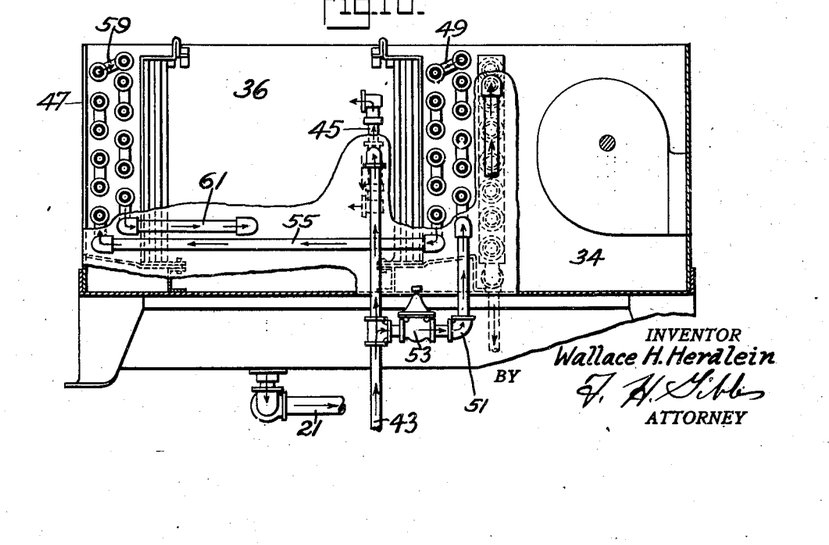
Fig. 10 is a sectional view on the line 10—10, Fig. 9.

Referring now to Figs. 6 to 10, inclusive, which show a modified form of the invention, the refrigerant, such as water ice, is retained in a bunker or ice chamber indicated generally at B, Figs. 6 and 7, said ice chamber being suspended from the car body underframe as more clearly shown in Fig. 8 and comprising a frame 3, top and bottom walls 9 and 11, respectively, each of which, in the instance shown, is formed of spaced metal members secured to the frame. If desired, suitable insulating material may be provided in the spaces S between the members forming the top and bottom walls, as would be obvious. The ice chamber B also includes side walls 13 and 15, respectively, and end walls comprising hinged doors 17. As shown clearly in Fig. 8, the top and bottom walls of the ice chamber B slope downwardly from the end walls 17 toward the longitudinal center line of the ice chamber whereby ice retained within the chamber is constantly maintained at approximately the center of the chamber and therefore beneath a perforated drip pipe 19 connected to the lower end of water return pipes 21, hereinafter more fully described.

The ice chamber B is supported by hangers H, certain of which are secured to and depend from the center sills 23 of the car body and others are secured to and depend from cross bearers 25 interposed between and connected with the center sills 23 and body side sills 27, all as clearly shown in Fig. 8.

The ice chamber B is provided with a supporting shelf or rack 29 on which is mounted a pump 31 which is operated by a suitable motor 33, also mounted on the support 29, said pump being adapted to draw water through an intake pipe 35 arranged in a sump 37 formed in the bottom wall 11 of the ice chamber and force said water through a delivery pipe 39 to a header 41 extending longitudinally of the car body as shown clearly in Figs. 6 and 7.

The ends of the header 41 are connected with risers 43 leading to spray pipes 45 arranged within the spray chambers 36 of air conditioning cabinets supported at opposite end portions of the car body as shown in Figs. 6 and 7, said air conditioning cabinets being generally indicated in Figs. 6 and 7 at 47.

The air conditioning cabinets 47 are, in the main, of substantially the same construction as that shown in Figs. 3 and 4 and therefore similar parts are indicated with like reference characters.

Arranged in the blower chamber 34 adjacent eliminator 32 is a heat exchange coil 49 which receives water from riser 43 through a branch 51 (see Fig. 10) having a pressure relief valve 53 therein which is operative in response to predetermined pressure within the riser 43. As shown more clearly in Figs. 9 and 10, the discharge end of coil 49 is connected by a transfer pipe 55 to a heat exchange coil 59 arranged at the air entrance end of the cabinet and having its outlet end arranged to discharge into the spray chamber 36, as shown particularly well in Fig. 9. A drain opening 63 is formed in the bottom wall of the spray chamber 36 and the return pipe 21 is connected therewith. The opposite end portions of each of the return pipes 21 are connected with the drip pipe 19, as shown more clearly in Fig. 7.

In the form of the invention shown in Figs. 6 to 10, inclusive, the air discharge nozzles 56 are connected to bulkheads 65 extending between the deck plates 67 of the monitor deck, said bulkheads being provided with air discharge openings 69 through which the conditioned air from the cabinets 47 is forced into the passenger compartment of the car. In Fig. 8 the openings 69 are illustrated as elongated slots but within the spirit of the present invention it is obvious that they may assume any preferred or desired form which will provide for uniform distribution of air within the car body.

Figure 5:
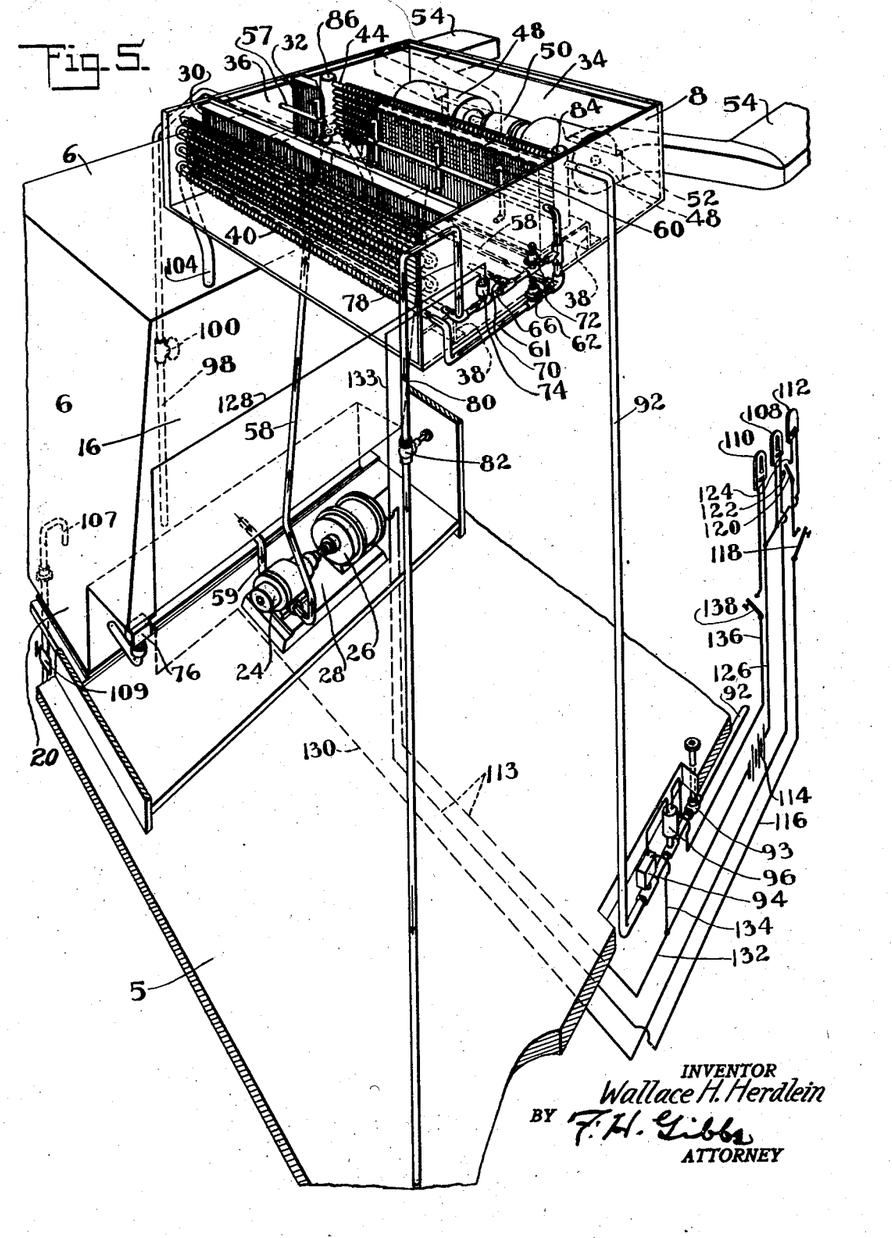
Fig. 5 is an isometric view of the system of the present invention.

The control for the systems shown in Figs. 1 to 5, inclusive, and 6 to 10, inclusive, is the same and, for purposes of illustration is shown associated with the system of Fig. 5. The system is automatically controlled by means responsive to variations in temperature and humidity conditions of the air within the passenger compartment of the car as now to be described. During seasons of the year when heating of the air is not required the control means comprises a cooling thermostat 108, while at other times the system is controlled by a heating thermostat 110 and a humidostat 112. It is to be understood that the terms "cooling" and "heating" are used only for convenience in description in referring to thermostats 108 and 110, respectively, and are not intended to place any limitations upon the structures. Fig. 5 discloses one form of wiring diagram but this is merely by way of example and in said Fig. 5 it can be seen that the motor 26 is arranged in a main circuit 113 in which is a battery 114, the circuit 113 including a conductor 116 having a manual switch 118 for closing the circuit. The circuit 113 also includes a selector switch 120 which is adapted to contact with either terminal 122 or 124 whereby either the cooling thermostat 108 or the humidostat and heating thermostat are included in the circuit. Circuit 113 also includes a conductor 126 to which the before-mentioned thermostats and humidostat are connected as shown in Fig. 5, said conductor 126 leading to the battery 114.

Fig. 5 shows the system arranged for operation during seasons when heating of the air is unnecessary, selector switch 120 contacting with terminal 122 to include the cooling thermostat 108 in the circuit 113 and to isolate the heating thermostat 110 and the humidostat 112 away from the circuit 113. Upon closing the switch 118, the motors which control pump 26 of Fig. 5 or 33 of Fig. 7 are set in operation and water is withdrawn from the reservoir 20 of Fig. 5 or the sump 37 of Fig. 8 and forced to the air conditioning cabinets; in Figs. 1 to 5, inclusive, the water is forced through the pipe 58 and in Figs. 6 to 10, inclusive, the water is forced through pipe 39, header 41 and riser 43. The water passes to the spray nozzles in the air conditioning cabinet, as will be apparent. In the system shown in Fig. 5, the pressure relief valve 62 is adjusted to open in response to pressure of the water in pipe 58 above a certain degree. In practice, it has been found satisfactory to adjust valve 62 to operate when the water in pipe 58 reaches a pressure in excess of nine pounds whereby to force water through pipe 61 to the cooling coil 40 from where it returns to the system through branch pipe 66 and outlet pipe 70. At times it may be unnecessary to pre-cool the air by coil 40 and therefore the speed of the motor will be adjusted so that the water forced through pipe 58 will normally be at a pressure insufficient to open the valve 62, as will be apparent. Even at slow speeds of the motor and with water being forced through pipe 58 at a pressure below that at which valve 62 is adjusted, the pressure may be built up within the spray pipes and pipe 58 for various reasons, such for example as clogging of the spray nozzles and the valve 62 prevents the building up of back pressure on the pump 24, which might have a disadvantageous effect on the motor; the valve 62 opening in response to pressure within pipe 58 in excess of that at which the valve is set to permit passage of water to the cooling coil for discharge into the air conditioning cabinet until such time as the pressure in pipe 58 is reduced to a point at which the valve 62 will close. The spray water and the water discharged through pipe 70 passes through the fitting 102 and branches 104 into the ice chamber 6, the water being discharged into the trough 18 and passing therefrom on to the ice where it is cooled and returned to the reservoir 20. In air conditioning systems using water sprays it is desirable and indeed almost necessary that the water issuing from the spray nozzles be in the form of a fine spray and if the water carried to the spray nozzles be under an excessive pressure the water will issue from the spray nozzles in a spray which is too finely divided and separation of the suspended water particles from the air becomes almost impossible. Due to the provision of the valve 62 which opens in response to a predetermined pressure the water issuing from the nozzles 60 is always in the form of a spray instead of an extremely fine mist. Hence the valve 62 serves to maintain the proper functioning of the spray nozzles 60.

The float-controlled pressure switch 76 is electrically connected with the magnetic valve 74 by means of a conductor 128 and is connected with the switch terminal 122 adjacent the cooling thermostat 108 by means of a conductor 130 while the valve 74 is connected to conductor 132 of the circuit 113 by means of conductor 133. The switch which may be adjacent the thermostat 108 will be of such a type that when the switch lever 120 is thrown to contacts 122 the wires 116 and 130 will be connected to the thermostat 108 and when the lever 120 is thrown to contacts 124 the connection between wire 130 and the thermostat 108 will be broken and wire 116 will be connected to the humidostat 112. From the description just above it can be seen that upon increase of water in the reservoir 20 the switch 76 which is normally open is closed to close a circuit including conductors 128, 130, 133, and 132 to operate valve 74 and prevent discharge of water from the cooling coil 40 to the discharge pipe 70 and force the water coming from coil 40 to pass upwardly through riser 78 into discharge pipe 80 to be discharged out of the system. Obviously, when the level of the water in reservoir 20 lowers the float-control switch 76 the circuit just described is broken and the magnetic valve 74 is opened to permit normal operation of the system whereby water from the coil 40 is discharged into the spray chamber 36 through pipe 70.

The most efficient operation of the system shown in Figs. 1 to 5, inclusive, comprises a relatively slow discharge of excess water through the pipe 80 and to accomplish this the valve 82 in said pipe 80 is adjusted so as to limit the speed of flow of water through the pipe 80. In practice it has been found that efficiency is greatly increased by restricting discharge of water through pipe 80 to approximately two gallons per minute; this slow discharge of water permitting the water to absorb a maximum number of heat units from the incoming air prior to discharge from the system. Because of this it necessarily follows that the pressure on pump 24 will increase and unless some means is provided for prevention, the excess pressure would cause the spray water from nozzles 60 to be too finely divided. To compensate for the building up of pressure on pump 24 due to the constriction effected by the valve 82 in discharge pipe 80 the pressure relief valve 72 is provided which is adjusted to permit water from pipe 58 in excess of eleven pounds to be by-passed through branch pipe 66 to the outlet pipe 70 into the spray chamber 36 from where it is returned to the ice chamber through the fitting 102 and branches 104.

In the system of Figs. 6 to 10, inclusive, the relief valves 53 are operative in response to predetermined pressure of water in the risers 43 to permit passage of water to the heat exchange coils and prevent the water issuing from the spray nozzles being too finely divided.

As before-mentioned, the operation just described is that present during warmer seasons of the year when heating of the air is not required. The cooling thermostat 108 is positioned within the passenger compartment of the car and operates in response to temperature conditions within said passenger compartment. It will be apparent that when the temperature within the passenger compartment reaches a predetermined low degree the thermostat will break the circuit 113, thus stopping operation of pump-controlling motor and in the system of Figs. 1 to 5, inclusive, because of the connection of the switch 76 and valve 74 in circuit 113, the valve 74 will be de-energized and will assume its normal open position.

For winter operation or for operation of the system during seasons when water ice is not used, but in which it may be necessary to heat the air before recirculating the same into the car, the selector switch 120 is moved to contact with terminal 124, thus connecting the humidostat 112 and the heating thermostat 110 in circuit 113. The pressure switch 94 and the magnetic valve 96 are connected in circuit 113 by means of a conductor 134 which leads from conductor 132 of circuit 113 to switch 94 and conductor 136 which leads from the magnetic valve 96 to the heating thermostat 110 and is provided with a manually operated switch 138. As will be clearly evident from Fig. 5 of the drawings, when the selector switch 120 is in contact with terminal 124 the cooling thermostat 108 is disconnected from the circuit 113. It will also be apparent that by disconnecting cooling thermostat 108 from circuit 113 the circuit controlling the float-control switch 76 and the magnetic valve 74 is also isolated from the circuit 113. During operation of the system for the winter months or for seasons when water ice is not used, the reservoir 20 can obviously contain more water and becomes strictly a storage receptacle for continuous circulation of water. Closing the manual switch 118 with the selector switch in contact with terminal 124 actuates motor 26 to cause the pump 24 to circulate water from reservoir 20 through the spray nozzles and heat exchange coil 40 in a manner hereinbefore described in reference to use of the system with water ice. The humidostat 112 is adjusted to operate in accordance with desired and required humidity conditions of the air within the passenger compartment of the car whereby when the humidity exceeds a predetermined point the humidostat will function to break circuit 113 and cause the motor 26 to stop and thus prevent further circulation of water to the spray nozzles 60 until the air within the passenger compartment requires humidification. The magnetic valve 96 is operated by the heating thermostat 110 and is so formed as to close upon being de-energized by operation of said thermostat, which occurs when the temperature within the passenger compartment becomes greater than that for which the thermostat has been adjusted. It will be apparent from this description that the heating circuit is normally closed and therefore valve 96 is normally retained in open position at times when heating of the air is required so as to permit passage of steam through the pipe 92. Operation of the valve 96 is also controlled by the pressure switch 94, the latter being so formed as to be actuated upon increase in steam pressure in the steam coil 44 and pipe 92 beyond a predetermined degree to break the heating circuit, thereby de-energizing the magnetic valve 96 whereby the latter closes the pipe 92 against passage of steam to the heating coil. This operation occurs regardless of the operation of the thermostat 110 and it will be apparent that when the steam pressure in pipe 92 and heating coil 44 decreases to an amount sufficient to permit the switch 94 to close the heating circuit will be re-established and the magnetic valve 96 opened to permit passage of steam to the heating coil.

Due to the provision of the pressure switch 94 the dangers incident to the carrying of high steam pressures in the car is eliminated and a more uniform operation of the heating coil at a predetermined steam pressure results.

Figure 11:
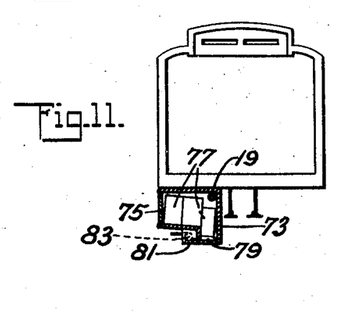
Fig. 11 is a view showing a modified form of ice chamber or bunker to be used in connection with the system shown in Figs. 6 and 7.
Figure 12:
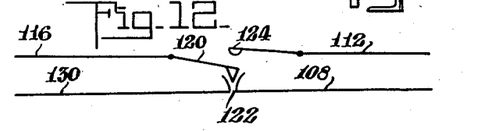
Figure 12 is a view showing in detail one type of controlling switch that may be used.

Fig. 11 shows a modified form of ice bunker or chamber, the same being suspended from the underframe of the car body and comprising a receptacle 73 having a hinged door 75 through which water ice 77 may be inserted thereinto. The receptacle 73 is so formed as to provide a reservoir 79 adapted to receive a cake of ice, as shown clearly in said Fig. 11, and to hold water melting from the ice. In this form of the invention the drip pipe 19 is arranged adjacent an upper corner of the receptacle so that water passing therefrom will drip directly on to the ice in the reservoir 79. The receptacle 73 is provided with a support 81 for the motor and pump 83.

During the description above the general operation of the system of the present invention has been set forth so that no further specific description is believed to be necessary. It will be obvious to those skilled in the art that the present invention provides a means for maintaining the air within the passenger compartment of a railway car or other enclosure at any predetermined or desired condition relative to temperature and humidity. It is further believed to be obvious that the present system provides a substantially automatically functioning air conditioning system which is comprised of relatively few parts and which is comparatively easy and inexpensive to manufacture and install. The present system also provides a new and improved means for eliminating and discharging excess water at intervals.

Due to the provision of the valves 62 and 72 the system of Figs. 1 to 5, inclusive, may be nicely controlled as to circulation of water through the cooling coil 40 and also relative to the condition of the water discharged from the nozzles 60, this being dependent upon the speed of the motor 26 to regulate or control the action of the pump 24 so that the water passed through pipe 58 may be at a predetermined or desired pressure.

The drawings herein illustrate certain embodiments of the invention but it is to be understood they are for illustrative purposes only and various changes in the form and proportions of the construction and assembly may be made within the scope of the appended claims without departing from the spirit of the invention.

What is claimed is:

1. In an air conditioning system for enclosures, a chamber holding water ice, an air conditioning cabinet having a spray chamber, nozzles in said chamber, pump means operative in response to variations in humidity conditions within the enclosure for circulating water between the ice chamber and spray nozzles, a heat exchange coil in the cabinet adapted to receive water from the ice chamber, and valve means operative in response to variations in pressure of the water circulated to the spray nozzles for controlling passage of water to the heat exchange coil thereby maintaining proper functioning of the spray nozzles.

2. In an air conditioning system for enclosures, an ice chamber, an air conditioning cabinet having spray devices therein, a delivery pipe connecting the ice chamber and spray devices, pump means for forcing water through the delivery pipe to the spray devices, a heat exchange coil in the cabinet, a coil feeder pipe connecting the heat exchange coil and delivery pipe, said heat exchange coil having its outlet end portion arranged to discharge within the cabinet, and valve means in the coil feeder pipe operative in response to variations in pressure of the water passing through the delivery pipe for controlling passage of water to the heat exchange coil.

3. In an air conditioning system for enclosures, an ice chamber, an air conditioning cabinet having spray devices therein, a delivery pipe connecting the ice chamber and spray devices, substantially continuously operating pump means for circulating water between the ice chamber and spray devices, a heat exchange coil in the cabinet having its outlet end portion arranged to discharge into the cabinet, a coil feeder pipe connecting the heat exchange coil and delivery pipe, valve means in the feeder pipe operative in response to variations in pressure of water in the delivery pipe for controlling circulation of water between the ice chamber and heat exchange coil, a discharge pipe connected to the outlet end portion of the heat exchange coil and arranged to discharge outside the enclosure, and valve means in the outlet end portion of the heat exchange coil operative in response to variations in water level in the ice chamber for closing the outlet end portion of the heat exchange coil against discharge into the air conditioning cabinet whereby to force excess water through the discharge pipe.

4. In an air conditioning system for enclosures, an ice chamber, an air conditioning cabinet having a spray chamber, a delivery pipe for conducting water from the ice chamber to the spray chamber, pump means operative in response to variations in humidity conditions within the enclosure for controlling circulation of water between the ice chamber and spray chamber, a heat exchange coil in the cabinet, a coil feeder pipe connecting the heat exchange coil and delivery pipe, valve means operative in response to variations in water pressure within the delivery pipe for controlling passage of water to the heat exchange coil, a branch pipe connecting the outlet end portion of the heat exchange coil and said delivery pipe, a water discharge fitting extending into the cabinet, valve means in said branch pipe operative in response to variations in pressure within the delivery pipe for conducting water from the latter through the water discharge fitting into the cabinet, a discharge pipe leading from the branch pipe and having its outlet end arranged to discharge outside the enclosure, and valve means in said branch pipe between the discharge pipe and discharge fitting operative in response to variations in water level in the ice chamber to close said branch pipe against passage of water from the heat exchange coil to the discharge fitting whereby to force excess water from the system through the discharge pipe.

5. In an air conditioning system for railway passenger cars, an ice chamber, an air conditioning cabinet, spray devices in the cabinet, a heat exchange coil in the cabinet, a delivery pipe connecting the ice chamber and spray devices, substantially continuously operating means for forcing water through the delivery pipe to the spray devices, a coil feeder pipe connecting the delivery pipe and heat exchange coil, a branch pipe connecting the discharge end of the heat exchange coil and the delivery pipe and provided with a discharge fitting leading into the cabinet, a pressure valve in the coil feeder pipe operative in response to pressure of water passing through the delivery pipe for controlling passage of water to the heat exchange coil, a pressure valve in the branch pipe operative in response to water pressure in the delivery pipe in excess of that required to operate said first named pressure valve whereby water from the delivery pipe is passed directly into the cabinet without passing through the spray devices, a discharge pipe connected with the branch pipe and having its outlet end arranged to discharge outside the car, valve means in the discharge pipe for regulating passage of water therethrough, and valve means in the branch pipe between the discharge pipe and discharge fitting operative in response to increase in water level in the ice chamber to close said branch pipe against discharge of water from the heat exchange coil to the cabinet whereby to force excess water from the system through the discharge pipe.

6. In an air conditioning system for railway passenger cars, an ice chamber, an air conditioning cabinet, spray devices in the cabinet, a delivery pipe connecting the ice chamber and spray devices, substantially continuously operating pump means for forcing water through the delivery pipe, a heat exchange coil in the cabinet connected with the pipe to receive water therefrom and having its outlet end portion arranged to discharge into the cabinet, a discharge pipe connected with the outlet end portion of the heat exchange coil, and intermittently operating means in the outlet end portion of the heat exchange coil for directing excess water to the discharge pipe.

7. In an air conditioning system for railway passenger cars, an ice chamber, an air conditioning cabinet, spray devices in the cabinet, a delivery pipe connecting the ice chamber and spray devices, substantially continuously operating pump means for forcing water through the delivery pipe, a heat exchange coil in the cabinet connected with the pipe to receive water therefrom and having its outlet end portion arranged to discharge into the cabinet, a discharge pipe connected with the outlet end portion of the heat exchange coil, means operative in response to variations in pressure of the water passing through the delivery pipe for controlling passage of water to the heat exchange coil and intermittently operating means in the outlet end portion of the cooling coil for directing excess water to the discharge pipe.

8. In an air conditioning system for railway passenger cars, a chamber so formed as to provide a water reservoir, an air conditioning cabinet, spray devices in the cabinet, a delivery pipe connecting the spray devices and water reservoir, pump means for forcing water through said delivery pipe, a heat exchange coil in the cabinet, a coil feeder pipe connecting the heat exchange coil and delivery pipe, valve means in the coil feeder pipe operative in response to variations in pressure of the water passing through said delivery pipe for controlling passage of water to the heat exchange coil, said heat exchange coil having its outlet end portion arranged to discharge into the cabinet, a heating coil in the cabinet, pipe means for conducting a heating medium to said heating coil, a main electric circuit in which the pump is arranged, a heating circuit for controlling passage of heating medium to the heating coil, means operative in response to variations in temperature conditions within the passenger compartment of the car for controlling the operation of said heating circuit, and means operative in response to humidity conditions of the air within the passenger compartment of the car for controlling operation of said main circuit.

9. In an air conditioning system, a chamber having a water reservoir, a cabinet receiving air to be conditioned and provided with a cooling coil and a spray chamber, means for conducting water from the reservoir to the spray chamber, means for returning the water from the spray chamber to the reservoir, said cooling coil having its outlet end portion arranged to discharge within the cabinet, a discharge pipe connected with the outlet end portion of the cooling coil and arranged to discharge out of the system, and valve means in the outlet end portion of the cooling coil set in operation automatically by water in the reservoir upon increase thereof beyond a predetermined amount for closing the outlet end portion against discharge of water into the cabinet whereby to force water from the cooling coil through the discharge pipe and out of the system.

10. In an air conditioning system adapted to and using water ice, an ice chamber, an air conditioning cabinet having a spray chamber, substantially continuously operating means for forcing water from the ice chamber to the spray chamber, means for returning the water from the spray chamber to the ice chamber, said means being so arranged as to discharge the water on the ice whereby it is recooled, a cooling coil in the cabinet having its outlet end portion arranged to discharge into the spray chamber, a discharge pipe leading from the outlet end portion of the cooling coil and arranged to discharge out of the system, and intermittently operating valve means in the outlet end portion of the cooling coil adapted to close said outlet end portion against passage of water into the cabinet whereby to force the water from the cooling coil through the discharge pipe.

11. In an air conditioning system, an ice chamber, a cabinet for receiving air to be conditioned and provided with a spray chamber and a cooling coil, a delivery pipe for conducting water from the ice chamber to the spray chamber, return means for the water from the spray chamber to the ice chamber, a coil feeder pipe connecting the cooling coil and delivery pipe, the outlet end portion of said cooling coil being arranged to discharge into the cabinet, a discharge pipe leading from the outlet end portion of the cooling coil and having its outlet end arranged to discharge outside the system, and means in the outlet end portion of the cooling coil so formed and arranged as to be operative in response to excess water in the ice chamber to close the outlet end portion against passage of water into the cabinet whereby water from the cooling coil is forced through the discharge pipe.

12. In an air conditioning system for passenger cars, an ice chamber arranged adjacent a side wall of the car, an air conditioning cabinet adjacent the car roof, a delivery pipe connecting the ice chamber and cabinet, a drain from the cabinet adapted to return the water therefrom to the ice chamber, a heat exchange coil in the cabinet connected with the delivery pipe, the outlet end portion of the heat exchange coil being arranged to discharge into the cabinet, a discharge pipe connected with the outlet end portion of the heat exchange coil and arranged to discharge out of the system, a valve in the outlet end portion of the heat exchange coil, and float controlled means operative by water in the ice chamber beyond a predetermined amount for operating said valve to closed position whereby to prevent passage of water from the cooling coil to the cabinet and force water through the discharge pipe and out of the system.

13. In an air conditioning system, for passenger cars, a closed chamber positioned adjacent a side wall of the car and having a water reservoir, a cabinet adjacent the car roof, said cabinet having a spray chamber and a blower chamber, a delivery pipe for conducting water from the reservoir to the spray chamber, a heat exchange coil in the cabinet connected with the delivery pipe to receive water therefrom, means operative in response to variations in the pressure of the water passing through the delivery pipe for controlling passage of water to the heat exchange coil, blower means in the blower chamber for effecting passage of air through the cabinet, the heat exchange coil having its outlet end portion arranged to discharge into the cabinet, a discharge pipe leading from the outlet end portion of the heat exchange coil and having its discharge end arranged outside the system, and intermittently operating valve means in the outlet end portion of the heat exchange coil adapted to close the outlet end portion against passage of water into the cabinet whereby to cause water to pass through the discharge pipe and out of the system.

14. In an air conditioning system for railway passenger cars, a chamber suspended below the bottom of the car and holding water ice, an air conditioning cabinet adjacent the car roof and provided with a spray chamber, spray nozzles in said chamber means operative in response to variations in humidity conditions within the railway car for circulatng water between the ice holding nozzles and spray chamber, a cooling coil in the cabinet, and means operative in response to variations in pressure of the water circulated to the spray nozzles for controlling passage of water to the cooling coil thereby maintaining proper functioning of the spray nozzles.

15. In an air conditioning system for railway passenger cars, an ice chamber suspended below the car bottom and having ice supporting surfaces sloping toward each other whereby the ice on said surfaces is maintained in contact, an air conditioning cabinet adjacent the car roof having spray devices therein, a sump formed with the ice chamber, a delivery pipe leading from the sump to the spray devices, pump means for circulating water between the sump and spray devices, a heat exchange coil in the cabinet having its outlet end portion arranged to discharge into the cabinet, a coil feeder pipe connecting the heat exchange coil and delivery pipe, valve means in the feeder pipe for controlling passage of water from the delivery pipe to the heat exchange coil, a water return pipe leading from the spray chamber and having its outlet end arranged within the ice chamber in such a position as to discharge water onto the ice therein, and means operative in response to variations in humidity conditions within the enclosure for circulating water between the ice chamber and spray chamber.

16. In an air conditioning system for railway passenger cars, a chamber holding water ice suspended below the car bottom and provided with means for collecting water therein, an air conditioning cabinet adjacent the roof of the car and provided with spaced eliminators therein defining a spray chamber therebetween, means operative in response to variations in humidity conditions within the car body for circulating water between the ice chamber and spray chamber, a cooling coil arranged adjacent each of said eliminators but outside of said spray chamber, a coil feeder pipe adapted to receive water circulated between the ice chamber and spray chamber, and valve means operative in response to variations in pressure of the water circulated to said spray chamber for controlling passage of water to said cooling coils.

17. In an air conditioning system for enclosures, a chamber holding water ice, an air conditioning cabinet having a spray chamber, spray nozzles in said chamber, means operative in response to variations in humidity conditions within the enclosure for circulating water from the ice chamber to the spray nozzles for ejection into said spray chamber, a cooling coil in the cabinet, and means operative in response to pre-determined pressure of the water circulated to the spray nozzles for maintaining substantially uniform pressure of said water whereby to maintain proper functioning of the spray nozzles.

WALLACE H. HERDLEIN.